(12) United States Patent
Gentelet et al.

(10) Patent No.: US 9,361,571 B2
(45) Date of Patent: Jun. 7, 2016

(54) MATRIX OF ADHESIVE RFID TAGS

(75) Inventors: Franck Gentelet, Taissy (FR);
Jean-Clément Bouveresse, Sannois (FR); Yves Le Nevez, Versailles (FR)

(73) Assignee: IER, Suresnes (FR)

( * ) Notice: Subject to any disclaimer, the term of this patent is extended or adjusted under 35 U.S.C. 154(b) by 173 days.

(21) Appl. No.: 13/822,905

(22) PCT Filed: Oct. 20, 2011
(Under 37 CFR 1.47)

(86) PCT No.: PCT/FR2011/052457
§ 371 (c)(1),
(2), (4) Date: May 2, 2014

(87) PCT Pub. No.: WO2012/025700
PCT Pub. Date: Mar. 1, 2012

(65) Prior Publication Data
US 2014/0353383 A1    Dec. 4, 2014

(30) Foreign Application Priority Data

Oct. 22, 2010   (FR) ..................................... 10 58698

(51) Int. Cl.
| | |
|---|---|
| *G06K 19/06* | (2006.01) |
| *G06K 19/077* | (2006.01) |
| *G09F 3/00* | (2006.01) |
| *G09F 3/10* | (2006.01) |
| *G06K 19/07* | (2006.01) |
| *G09F 3/02* | (2006.01) |

(52) U.S. Cl.
CPC .......... *G06K 19/0776* (2013.01); *G06K 19/072* (2013.01); *G06K 19/07722* (2013.01); *G06K 19/07749* (2013.01); *G09F 3/0297* (2013.01); *G09F 3/10* (2013.01); *G09F 2003/0225* (2013.01); *G09F 2003/0245* (2013.01)

(58) Field of Classification Search
CPC ............ G06K 19/0776; G06K 19/072; G06K 19/07722; G06K 19/07749
USPC ......................................... 235/487, 488, 492
See application file for complete search history.

(56) References Cited

U.S. PATENT DOCUMENTS

| | | | |
|---|---|---|---|
| 6,610,379 B1 * | 8/2003 | Adams et al. ................ | 428/40.1 |
| 7,782,211 B2 * | 8/2010 | Yamaguchi et al. ....... | 340/572.7 |

(Continued)

FOREIGN PATENT DOCUMENTS

DE       19850353       3/2000

*Primary Examiner* — Paultep Savusdiphol
(74) *Attorney, Agent, or Firm* — Greer, Burns & Crain, Ltd.

(57) ABSTRACT

A matrix of tags is provided including a plurality of RFID identification tags, each RFID tag having an identification layer, arranged on an object to be identified, the identification layer bearing at least one antenna and at least one chip including capacity for storing an item of identification data, the identification layer containing a bonding face arranged on a wall of the object; a backing layer, arranged on the side of the bonding face of the identification layer; a transfer layer, arranged on the side opposite to the backing layer relative to the identification layer, the transfer layer being provided for transferring the identification layer onto the object; and a protective layer, arranged between the identification layer and the transfer layer, provided for protecting the identification layer when the tag is put in place; the transfer layer is produced in a single piece for the set of tags.

18 Claims, 2 Drawing Sheets

(56) References Cited

U.S. PATENT DOCUMENTS

| | | | |
|---|---|---|---|
| 2007/0096914 A1* | 5/2007 | Baba et al. | 340/572.3 |
| 2007/0212506 A1* | 9/2007 | Adair et al. | 428/40.1 |
| 2007/0222615 A1* | 9/2007 | Yamaguchi et al. | 340/572.8 |
| 2007/0252704 A1* | 11/2007 | Nagae | 340/572.8 |

* cited by examiner

MATRIX OF ADHESIVE RFID TAGS

FIELD OF THE INVENTION

The present invention relates to an adhesive RFID identification tag. It also relates to a matrix of tags comprising such adhesive tags.

The field of the invention is radio frequency identification (RFID), and more particularly RFID tags used for associating an identifier with an object bearing the tag.

BACKGROUND OF THE INVENTION

These days RFID tags are commonly used for the identification, monitoring and management of objects. The systems using RFID technology allow automated and more rapid management of objects in many fields.

Such RFID tags are presented in different forms and more particularly in adhesive form. The RFID adhesive tag is bonded onto a wall of the object to be identified by means of an adhesive agent.

An RFID tag is generally composed of an antenna and a chip coupled to this antenna. One or more items of identification data are recorded in storage means present in the chip.

When in adhesive form, the RFID tag contains a so-called identification layer, constituted by the RFID antenna and the chip. An adhesive agent is applied onto the identification layer and is intended to produce an adhesive bond between the identification layer and the wall of an object to be identified. This adhesive agent is hidden by a layer, hereinafter called the backing layer, which must be removed before applying the tag onto the wall of the object to be identified. The RFID tag is put in place using a layer, hereinafter called the transfer layer, present on the side opposite to the backing layer with respect to the identification layer. The transfer layer and the identification layer are bonded to each other.

Putting the RFID tag in place on the wall of the object is carried out as follows. The backing layer is removed. The identification layer is bonded onto the wall of the object by means of the transfer layer. Once the identification layer is bonded onto the wall of the object, the transfer layer is unstuck from the identification layer.

However, these adhesive RFID tags have drawbacks. Unsticking the transfer layer is often accompanied by a degradation of the identification layer, and more particularly of the antenna and/or the chip.

Moreover, in certain adhesive RFID tags, the identification layer can also contain data printed on the identification layer, such as the adhesive RFID tag described in document U.S. Pat. No. 6,163,260. In this case, unsticking the transfer layer can also damage the printed data so that the data are illegible after unsticking the transfer layer. When the identification layer is damaged, the RFID tag must be replaced.

A purpose of the present invention is to overcome the aforesaid drawbacks.

Another purpose of the invention is to propose a more robust adhesive RFID identification tag.

Finally, another purpose of the invention is to propose a matrix of adhesive RFID tags that is more practical to arrange on a set of objects to be identified.

SUMMARY OF THE INVENTION

The invention proposes to achieve the aforementioned purposes by an RFID identification tag comprising:
a so-called identification layer, provided to be arranged on an object to be identified, said identification layer bearing at least one antenna and at least one chip comprising means for storing an item of identification data, said identification layer containing a so-called bonding face, intended to be arranged on a wall of said object,
a so-called backing layer, arranged on the side of the bonding face of said identification layer,
a so-called transfer layer, arranged on the side opposite to the backing layer with respect to the identification layer, said transfer layer being provided for transferring said identification layer onto said object.

According to the invention, the RFID tag can moreover comprise a so-called protective layer, arranged between the identification layer and the transfer layer, provided for protecting said identification layer when said tag is arranged on an object.

This protective layer makes it possible to protect the identification layer from possible damage that can cause the transfer layer to become unstuck when the identification layer is put in place on the object to be identified.

Thus, the tag according to the invention is more robust than the adhesive RFID tags of the state of the art.

Moreover, the protective layer allows the transfer and identification layers to be separated in a more practical manner.

According to the invention, the identification layer can comprise a first so-called RFID under-layer, on which the antenna and the chip are arranged, on the side of the bonding face. The chip is coupled with the antenna. Moreover, being arranged on the side of the bonding face, the chip is protected against being accidentally torn away when the identification layer is arranged on the object to be identified.

According to a particularly advantageous version of the tag according to the invention, the identification layer can moreover comprise a second so-called print under-layer, at least part of which constitutes a print media.

The print under-layer can be arranged between the protective layer and the antenna, i.e. between the RFID under-layer and the protective layer.

Thus, the RFID tag according to the invention makes it possible to carry out both identification by RFID technology and an optical and/or visual identification via the inscription of data relating to the object to be identified. Thus, when the object to be identified is a product for consumption, it is possible to print the dates of production and expiry directly onto the adhesive tag, on the print layer. Thus, it is not necessary to have a dedicated RFID tag reader in order to access these items of information, which will be accessible directly to all users and consumers.

In a particular embodiment of the tag according to the invention:
the protective layer can be arranged on the identification layer with a first adhesive agent, for example acrylic-based, and
the transfer layer can be arranged on the protective layer with a second adhesive agent, for example acrylic-based, and
said first adhesive agent producing a stronger adhesive bond between the protective layer and the identification layer than the adhesive bond produced by said second adhesive agent between the protective layer and the transfer layer, so that when said transfer layer is removed, said protective layer remains bonded to said identification layer. Such a difference in adhesive strength between the first and second adhesive agents can be obtained with a different base weight concentration of adhesive component in these adhesive agents.

Thus, when the transfer layer is unstuck after having put the identification layer in place on the object, the protective layer remains bonded to the identification layer and protects it throughout its use.

Moreover, the backing layer can be arranged on the identification layer with a third adhesive agent, said third adhesive agent producing:

an adhesive bond between said backing layer and said identification layer that is weaker than the adhesive bond between the protective layer and the transfer layer, and an adhesive bond, between said identification layer and a wall on which said tag is put in place:

stronger than the adhesive bond between the protective layer and the transfer layer, and weaker than the adhesive bond between the protective layer and the identification layer.

Thus, when the backing layer is removed before putting the identification layer in place on the object, the identification layer remains firmly fixed to the transfer layer, which facilitates the handling of the RFID tag. Moreover, once the identification layer is bonded onto the wall of the object to be identified, it is possible to remove the transfer layer without unsticking the identification layer.

These different features allow the tag according to the invention to be handled in a practical and straightforward manner.

Advantageously, the backing layer can be produced at least partially with a siliconized material. The siliconized material facilitates unsticking the backing layer and its use also makes it possible to use a single adhesive agent to create an adhesive bond between the identification layer and a wall on which said tag is put in place that is stronger than the adhesive bond between the backing layer and the identification layer, and also stronger than the adhesive bond between the protective layer and the transfer layer.

Advantageously, the protective layer and the identification layer can comprise a transparent portion. Thus, it is possible to put the RFID tag in place on a wall containing pre-printed data which will remain visible through the transparent portion of the identification and protective layers. These data can for example comprise data regarding consumption or production dates.

The tag according to the invention can thus contain a transparent portion which can be in the form of a transparent window which leaves visible the data directly printed present on the object or packaging on which the tag is arranged.

According to an advantageous version of the tag according to the invention, the print layer can be produced in a transparent material on part of which a black print background is arranged.

According to an embodiment, the transparent material can be polyethylene.

According to another aspect of the invention, a matrix of tags is proposed comprising a plurality of tags according to the invention.

According to the invention, the matrix of tags contains a transfer layer which is produced in a single piece for the set of said tags of said matrix.

Thus, the matrix of tags contains a single transfer layer for the set of tags. This makes it possible to put in place in one go the set of tags of the matrix of tags, or at least several tags forming part of the matrix of tags.

According to an advantageous version of the matrix according to the invention, the backing layer can also be produced in a single piece for the set of tags. This makes it possible, in a single movement, to unstick the backing layer from the set of tags and thus to be able to arrange the set of tags, in a single movement, on several objects previously positioned in a suitable manner.

Advantageously, the transfer layer can contain so-called positioning apertures, carrying out the positioning of said matrix of tags when the RFID tags are put in place. These apertures enable the accurate positioning of each tag of the matrix of tags with respect to the objects on which these tags are to be bonded.

According to a particular version, the positioning apertures can be arranged on the periphery of the transfer layer.

According to another particular version, which can be combined with the previous version, the positioning apertures can be arranged on two opposite sides of the transfer layer.

For example, when the tags are put in place using a template, the positioning apertures allow accurate positioning of the matrix of tags with respect to this template.

The matrix of tags according to the invention can be used for the identification of boxes of coffee capsules.

BRIEF DESCRIPTION OF THE DRAWINGS

Other advantages and features will become apparent on examination of the detailed description of an embodiment which is in no way limitative and the attached diagrams in which.

DETAILED DESCRIPTION OF THE INVENTION

In the figures and in the remainder of the description, the elements common to several figures retain the same references.

Figure 1:
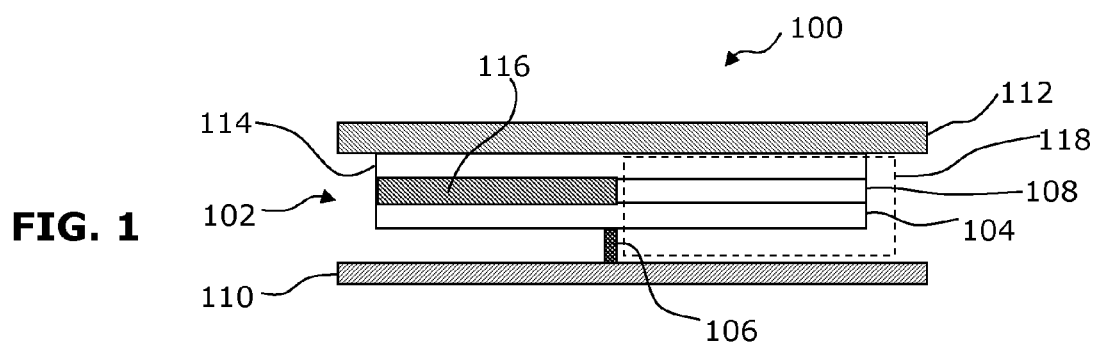
FIG. 1 shows a diagrammatic cross section of an RFID tag according to the invention.

FIG. 1 shows a diagrammatic cross section of an RFID tag 100 according to the invention.

The tag 100 contains an identification layer 102. The identification layer contains an RFID under-layer composed of an RFID antenna 104 and a chip 106 comprising storage means (not shown) in which at least one item of identification data is recorded. The RFID antenna 104 and the chip 106 are arranged so that when the identification layer is bonded onto an object to be identified, the chip 106 is placed between the antenna 104 and the wall of the object to be identified. Thus, the chip 106 is protected by the RFID antenna against being accidentally torn away, for example during handling of the object.

The identification layer 102 comprises moreover, on the side of the RFID antenna 104, an under-layer 108 for printing by UV ink constituted at least partially by a media for printing data relating to the object to be identified.

The RFID tag 100 contains moreover, on the side of the chip 106, a backing layer 110 that is intended to be removed before the identification layer 102 is bonded onto an object to be identified.

On the side opposite the backing layer 110 with respect to the identification layer 102, the RFID tag 100 contains a transfer layer 112 facilitating the handling of the RFID tag 100 once the backing layer 110 has been removed. This transfer layer 112 is unstuck after the identification layer has been bonded onto the object to be identified.

Advantageously, the RFID tag contains, between the identification layer 102 and the transfer layer 112, a layer 114 protecting the identification layer 102. The protective layer 114 is positioned more particularly between the transfer layer 112 and the print under-layer 108. This protective layer 114 is provided to protect the identification layer 102 against possible damage during unsticking of the transfer layer 112. Thus, the RFID antenna 104, the chip 106 and the print under-layer 108 are protected during unsticking of the transfer layer.

In the example shown in FIG. 1, the protective layer 114 is completely transparent. The RFID antenna 104 is also put in place on a transparent support.

The print under-layer 108 is produced in a transparent material. The print under-layer 108 contains a black background portion 116 allowing data to be printed on this portion 116.

Thus, once the backing layer 110 and the transfer layer 112 have been removed, the identification layer 102 and protective layer 114 assembly contains a transparent portion 118. This transparent portion 118 is provided to make it possible, by its transparency, to allow reading of the data previously printed directly on the object to be identified.

Figure 2:
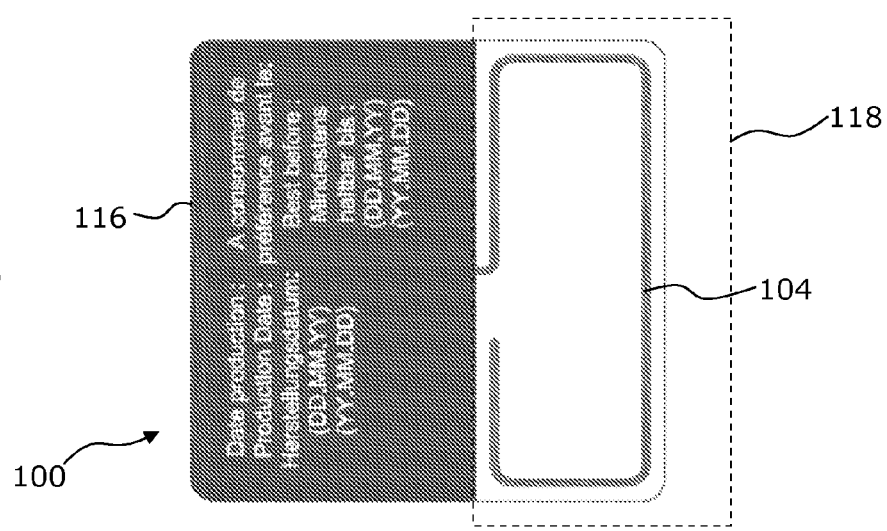
FIG. 2 shows a top view of the tag in FIG. 1 without the transfer and backing layers.

FIG. 2 shows a top view of the tag 100 without the backing layer 110 and without the transfer layer 112. As the protective layer 114 is completely transparent, this layer is not shown in FIG. 2. However, the print under-layer 108 is visible, with its printed black background portion 116. Thus, it is apparent in FIG. 2 that the identification layer 102 and protective layer 114 assembly contains a transparent portion 118.

Figure 3:
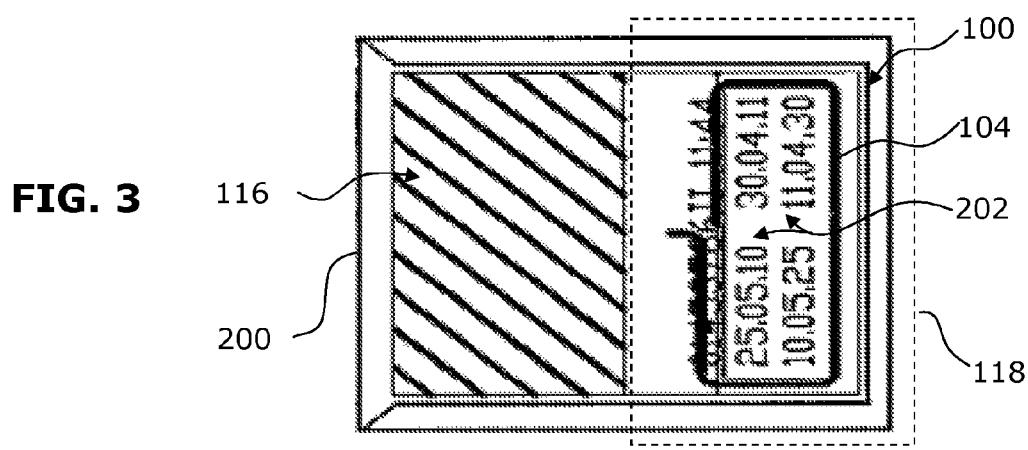
FIG. 3 shows a top view of the tag in FIG. 2 placed on an object.

FIG. 3 shows diagrammatically the assembly in FIG. 2 once put in place on a object 200 to be identified.

Data 202, previously put in place on the object 200, are visible through the transparent portion 118, due to the transparency. The black background portion 116 of the print under-layer 108 also remains visible and contains data (not shown) inscribed on the RFID tag 100. Thus, the tag according to the invention allows both access to data inscribed on the object to be identified, for example data of the type "composition", "date of production" etc., while making it possible to associate new data with the object to be identified, such as "expiry date" etc., using the print under-layer 108. All these data can be data that can be read directly by an operator and/or a consumer without using a dedicated reading device.

Figure 4:
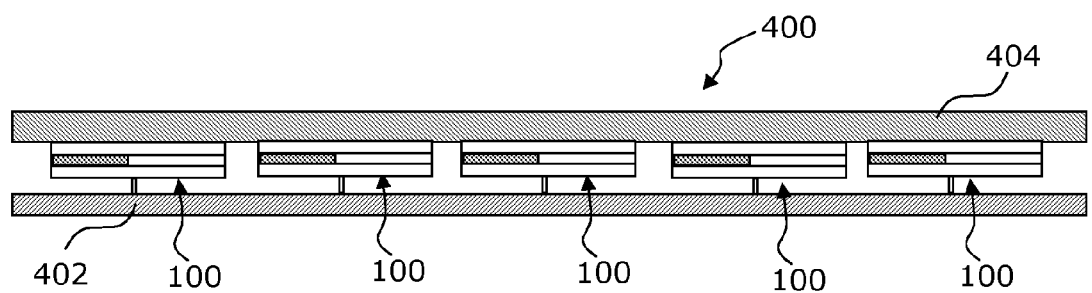
FIG. 4 shows a diagrammatic cross section of a matrix of tags according to the invention.

FIG. 4 shows a diagrammatic cross section of a matrix 400 of tags according to the invention.

The matrix 400 contains several adhesive RFID identification tags 100, each comprising an identification layer and a protective layer.

According to the invention, the matrix 400 of tags contains a single backing layer 402 common to all the tags 100 of the matrix 400. Still according to the invention, the matrix 400 of tags contains a single transfer layer 404 common to all the tags 100 of the matrix 400. Thus, putting in place the set of tags is facilitated as in a single movement the backing layer 402 can be removed for the set of tags of the matrix of tags 100. Similarly, in a single movement the transfer layer 404 can be removed for the set of tags of the matrix of tags 100 once the tags are bonded onto the pre-positioned objects to be identified.

Figure 5:
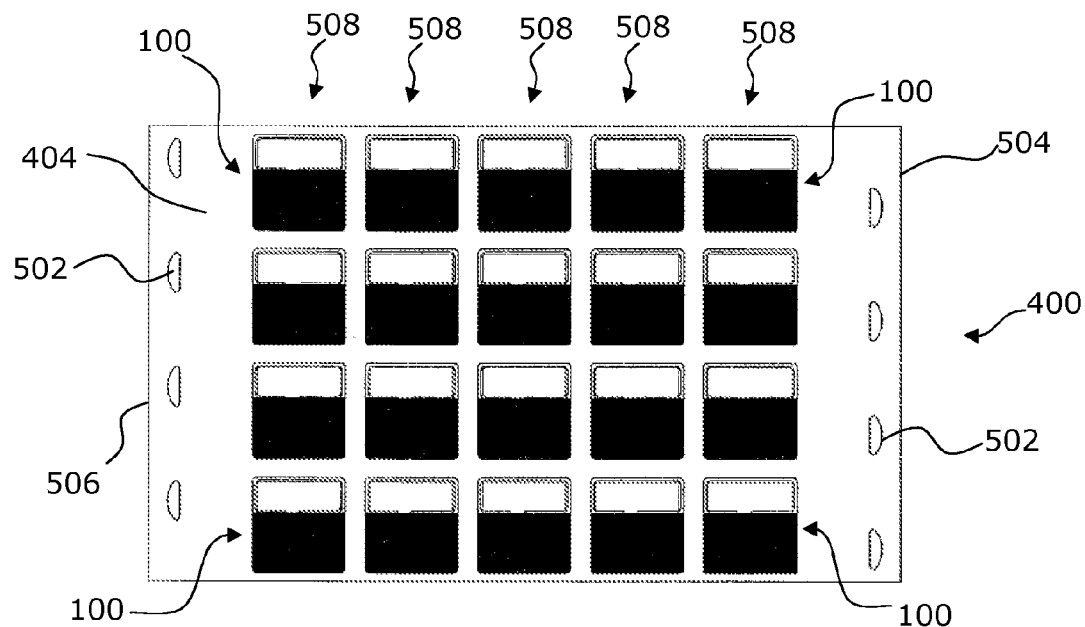
FIG. 5 shows a bottom view of the matrix of tags in FIG. 4 without the backing layer.

Putting tags 100 in place on the objects to be identified can be further facilitated by means for positioning the tags 100 forming part of the matrix 400 of tags. FIG. 5 is a bottom view of a matrix of tags according to the invention without the backing layer 402.

As shown in FIG. 5, the transfer layer 404 of the matrix 400 of tags 100 contains means for positioning the matrix of tags, which in the example shown in FIG. 5 are positioning apertures 502 arranged on two opposite sides 504 and 506 of the transfer layer 404. These positioning apertures 502 make it possible to accurately position the set of five rows 508 of RFID tags 100, for example using a template (not shown). In the example shown in FIG. 5, the matrix 400 of tags therefore contains twenty adhesive RFID tags 100.

In the examples described:
the transfer layer is produced from EUROCEL EV2111, having a thickness of 128 μm,
the backing layer is produced from TT BG40 Brown-S697-BG45 White, having a thickness of 55 μm, and
the print under-layer is produced from PP MATT TRANSPARENT 60, having a thickness of 57 μm, and
the protective layer is produced from PP MATT TRANSPARENT 20 having a thickness of 20 μm.

Moreover, the layers of the RFID tag are fixed together with adhesive agents having different adhesive strengths. Such adhesive agents with different adhesive strengths can, for example, be obtained with an acrylic base, having different base weights concentrations.

Of course, the invention is not limited to the examples that have just been described.

The invention claimed is:

1. A matrix of tags comprising a plurality of RFID identification tags, each of the RFID tags comprising:
an identification layer arranged on an object to be identified, said identification layer bearing at least one antenna and at least one chip comprising means for storing an item of identification data, said identification layer containing a bonding face arranged on a wall of said object,
a backing layer arranged on a side of the bonding face of said identification layer;
a transfer layer; produced as a single piece and arranged on a side opposite to the backing layer with respect to the identification layer, said transfer layer configured for transferring said identification layer onto said object; and
a protective layer arranged between said identification layer and said transfer layer, and configured for protecting said identification layer when said tag is arranged on said object.

2. The matrix of tags according to claim 1, wherein said backing layer is produced in a single piece for the set of tags.

3. The matrix of tags according to claim 1, wherein the transfer layer further comprises positioning apertures configured for carrying out positioning of said matrix of tags when the tags are put in place.

4. The matrix of tags according to claim 3, wherein the positioning apertures are arranged on the periphery of the transfer layer.

5. The matrix of tags according to claim 3, wherein the positioning apertures are arranged on two opposite sides of the transfer layer.

6. The matrix of tags according to claim 1, wherein for at least one tag, the identification layer comprises a first RFID under-layer on which the antenna and the chip are arranged on the side of the bonding face.

7. The matrix of tags according to claim 1, wherein for at least one tag, the identification layer comprises a second print under-layer, at least partially constituting a print media, said print under-layer being arranged between the protective layer and the antenna.

8. The matrix of tags according to claim 7, wherein the print under-layer is produced in a transparent material on part of which a black print background is arranged.

9. The matrix of tags according to claim 7, wherein the print under-layer is produced in polyethylene.

10. The matrix of tags according to claim 1, wherein for at least one tag:
- the protective layer is arranged on the identification layer with a first adhesive agent; and
- the protective layer is arranged on the transfer layer with a second adhesive agent;
- said first adhesive agent producing a stronger adhesive bond between the protective layer and the identification layer than the adhesive bond produced by said second adhesive agent between the protective layer and the transfer layer, so that when said transfer layer is removed, said protective layer remains bonded to said identification layer.

11. The matrix of tags according to claim 10, wherein the backing layer is arranged on the identification layer with a third adhesive agent, said third adhesive agent providing:
- an adhesive bond between said backing layer and said identification layer that is weaker than the adhesive bond between the protective layer and the transfer layer; and
- an adhesive bond, between said identification layer and a wall on which said tag is arranged:
- stronger than the adhesive bond between the protective layer and the transfer layer; and
- weaker than the adhesive bond between the protective layer and the identification layer.

12. The matrix of tags according to claim 1, wherein for at least one tag, the backing layer is produced at least partially with a siliconized material.

13. The matrix of tags according to claim 1, wherein for at least one tag, the protective layer and the identification layer comprise a transparent portion.

14. Use of the matrix of tags according to claim 1 for the identification of boxes of coffee capsules.

15. A matrix of tags comprising a plurality of RFID identification tags, each of the RFID tags comprising:
- an identification layer arranged on an object to be identified, said identification layer bearing at least one antenna and at least one chip comprising means for storing an item of identification data, said identification layer containing a bonding face arranged on a wall of said object,
- a backing layer arranged on a side of the bonding face of said identification layer;
- a transfer layer produced as a single piece and removably attached to a side opposite to the backing layer with respect to the identification layer, said transfer layer configured for transferring said identification layer onto said object; and
- a protective layer arranged between said identification layer and said transfer layer, and configured for protecting said identification layer when said tag is arranged on said object.

16. The matrix of tags according to claim 15, wherein the transfer layer further comprises positioning apertures configured for carrying out positioning of said matrix of tags when the tags are put in place.

17. The matrix of tags according to claim 16, wherein the positioning apertures are arranged on the periphery of the transfer layer.

18. The matrix of tags according to claim 16, wherein the positioning apertures are arranged on two opposite sides of the transfer layer.

* * * * *